USOO5752041A

United States Patent [19]
Fosdick

[11] Patent Number: 5,752,041
[45] Date of Patent: May 12, 1998

[54] METHOD AND SYSTEM FOR LICENSING PROGRAM MANAGEMENT WITHIN A DISTRIBUTED DATA PROCESSING SYSTEM

[75] Inventor: Eric L. Fosdick, Rochester, Minn.

[73] Assignee: International Business Machines Corporation, Armonk, N.Y.

[21] Appl. No.: 572,816

[22] Filed: Dec. 15, 1995

[51] Int. Cl.$^6$ ............................................. H04L 9/00
[52] U.S. Cl. ............ 395/712; 395/200.55; 395/187.01; 395/208; 380/4; 380/25
[58] Field of Search .................. 380/4, 25; 395/187.01, 395/208, 712, 200.55

[56] References Cited

U.S. PATENT DOCUMENTS

| | | | |
|---|---|---|---|
| 4,924,378 | 5/1990 | Hershey et al. | 395/187.01 |
| 4,937,863 | 6/1990 | Robert et al. | 380/4 |
| 5,023,907 | 6/1991 | Johnson et al. | 380/4 |
| 5,343,526 | 8/1994 | Lassers | 380/4 |
| 5,375,206 | 12/1994 | Hunter et al. | 395/712 |
| 5,390,297 | 2/1995 | Barber et al. | 395/712 |
| 5,438,508 | 8/1995 | Wyman | 395/208 |
| 5,579,222 | 11/1996 | Bains et al. | 395/712 |

*Primary Examiner*—Christopher B. Shin
*Attorney, Agent, or Firm*—Andrew J. Dillon

[57] ABSTRACT

A method and system for managing utilization of licensed program within a distributed data processing system having a number of local systems which minimizes the amount of network communication traffic required for such management. Each permitted use of a licensed program by a distributed data processing system is indicated by a use token which may be transferred to selected systems throughout the distributed data processing system. These use tokens are then periodically redistributed throughout the distributed data processing system in response to a requested usage by a particular system within the distributed data processing system. A use token transferred to a particular system is then maintained at that system upon completion of the usage until such time as a request for usage of the licensed program requires transfer of the use token to another system. In this manner the use tokens are effectively distributed throughout the distributed data processing system such that those systems most likely to request usage of the licensed program will maintain possession of the use tokens, minimizing network communication traffic.

12 Claims, 4 Drawing Sheets

| | SYSTEM A 100 | SYSTEM B 102 | 104 |
|---|---|---|---|
| Fig. 5A | LOCAL = 5 TOKEN = 0 | LOCAL = 3 TOKEN = 0 | NETWORK USERS = 8 |
| Fig. 5B | LOCAL = 6 TOKEN = +1 | LOCAL = 3 TOKEN = -1 | NETWORK USERS = 9 |
| Fig. 5C | LOCAL = 5 TOKEN = +1 | LOCAL = 3 TOKEN = -1 | NETWORK USERS = 8 |
| Fig. 5D | LOCAL = 6 TOKEN = +1 | LOCAL = 3 TOKEN = -1 | NETWORK USERS = 9 |
| Fig. 5E | LOCAL = 7 TOKEN = +2 | LOCAL = 3 TOKEN = -2 | NETWORK USERS = 10 |
| Fig. 5F | LOCAL = 7 TOKEN = +2 | LOCAL = 3 TOKEN = -2 | NETWORK USERS = 10 |
| Fig. 5G | LOCAL = 6 TOKEN = +2 | LOCAL = 3 TOKEN = -2 | NETWORK USERS = 9 |
| Fig. 5H | LOCAL = 6 TOKEN = +1 | LOCAL = 4 TOKEN = -1 | NETWORK USERS = 10 |

METHOD AND SYSTEM FOR LICENSING PROGRAM MANAGEMENT WITHIN A DISTRIBUTED DATA PROCESSING SYSTEM

BACKGROUND OF THE INVENTION

1. Technical Field

The present invention relates in general to an improved distributed data processing system and in particular to an improved method and system for licensed program management within a distributed data processing system. Still more particularly, the present invention relates to an improved method and system for licensed program management within a distributed data processing system which minimizes required network communication traffic.

2. Description of the Related Art

The licensing of computer software has, in the past, been typically accomplished by providing a copy of the software for each computer which was licensed to utilize that software. The licensed software was then "locked" to the particular computer and could not be legally utilized on another computer. The advent of wide spread computer networks rendered the practice of locking software to a particular computer inefficient. One solution to this problem is the utilization of a so-called "network license manager," also referred to as a "network license server." When a network license server is utilized the software may be installed on any or all of the systems within a distributed data processing system; however, only a certain number of licenses are purchased from the vendor of the software. The license server then limits the number of concurrent users of the software to the number of licenses which have been purchased. This is done by providing some form of license "token" to the software when a user begins to utilize the software. That is, each time a user wishes to utilize the software, the software sends a network message to the license server requesting a license token. If a token is available, it is returned to the software and the software then performs its function for the user.

In such systems, after the user has completed utilization of the software the token is then returned to the licensed server. When all licenses are in use, the next server requesting utilization of the software will not receive a token and must wait for a token to become available. For example, if a network has ten nodes, the software may be installed on all of the nodes. However, if only five licenses are purchased, only five users within the network may be able to concurrently utilize the software. Thus, if a sixth user attempts to utilize the software no license will be available. The software on the sixth node will not function until it receives an appropriate license token or key. In this manner the software vendor gets paid for the maximum number of concurrent users for a particular licensed software package and the customer may start small and add licenses for a particular licensed program as usage increases.

This technique has proven popular and several different license servers are available from different software vendors. Recently, techniques have been proposed for providing a common interface which allows application software to interface with various license servers.

While the utilization of license servers and distributed license tokens has provided a substantial increase in the efficiency of licensing within a distributed data processing system such systems involve substantial increases in network communication traffic which arise whenever a selected software application requires use of a license from the network license server. In the event that an available license is not present within the local system each license server within the distributed data processing network must be polled in order to locate a server having an available license. Further, after utilization of the license the license "token" must be returned to the licensed server for utilization by a subsequent user. Consequently, a need exists for a method and system for managing license programs within a distributed data processing system which minimizes this requirement for network communication traffic.

SUMMARY OF THE INVENTION

It is therefore one object of the present invention to provide an improved distributed data processing system.

It is another object of the present invention to provide an improved method and system for licensed program management within a distributed data processing system.

It is yet another object of the present invention to provide an improved method and system for licensed program management within a distributed data processing system which minimizes required network communication traffic.

The foregoing objects are achieved as is now described. A method and system are provided for managing the utilization of licensed programs within a distributed data processing system having a number of local systems which minimizes the amount of network communication traffic required for such management. Each permitted use of a licensed program by a distributed data processing system is indicated by a use token which may be transferred to selected systems throughout the distributed data processing system. These use tokens are then periodically redistributed throughout the distributed data processing system in response to a requested usage by a particular system within the distributed data processing system. A use token transferred to a particular system is then maintained at that system upon completion of the usage until such time as a request for usage of the licensed program requires transfer of the use token to another system. In this manner the use tokens are effectively distributed throughout the distributed data processing system such that those systems most likely to request usage of the licensed program will maintain possession of one or more use tokens, minimizing network communication traffic.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
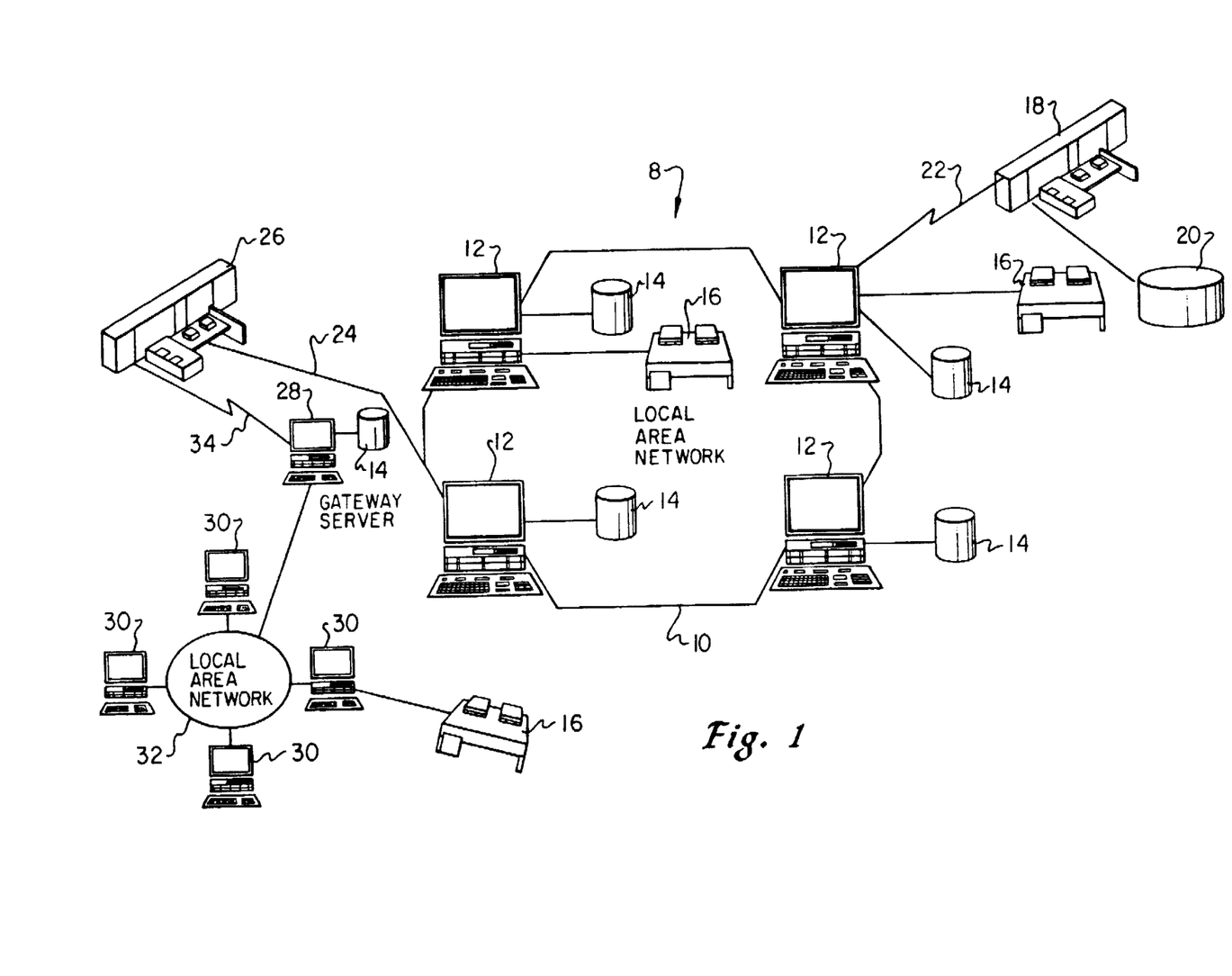
FIG. 1 is a pictorial representation of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data processing applications, licensed programs and use tokens which may be periodically utilized and/or redistributed within distributed data processing system 8, in accordance with the method and system of the present invention.

Still referring to FIG. 1, it may be seen that distributed data processing system 8 may also include multiple mainframe or so-called "mini" computers, such as the Application System/400 computer manufactured by International Business Machines Corporation of Armonk, N.Y., and illustrated herein as computer 18, which may be preferably coupled to Local Area Network (LAN) 10 by means of communications link 22. Computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing applications, licensed programs and use tokens may be stored within storage device 20 and controlled by computer 18 utilizing a License Server therein for controlling access to licensed programs within distributed data processing system 8.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing system 8 to utilize a licensed program which is controlled by use tokens which may be stored within another portion of distributed data processing system 8. As described above, it is common for multiple copies of a licensed program to be installed throughout distributed data processing system 8, wherein access to those licensed programs is controlled utilizing use tokens which are distributed by a license server within a host computer within distributed data processing system 8. The utilization of a licensed program is generally accomplished by requesting a use token, if a use token is unavailable at the local computer. The use token is then transferred from another system within distributed data processing system 8 in accordance with the rules and procedures set forth herein. In this manner, the utilization of licensed programs may be managed throughout distributed data processing system 8 and network communication traffic can be minimized by following the procedures set forth herein.

Figure 2:
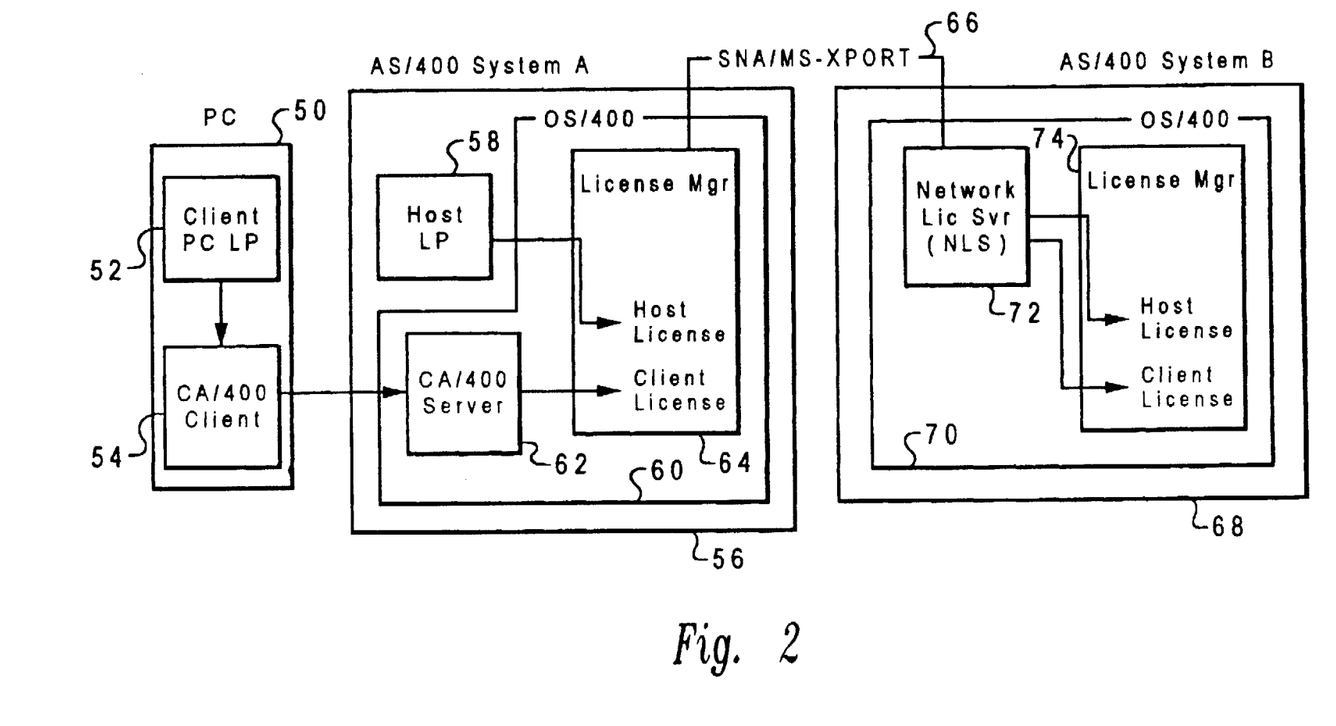
FIG. 2 is a high level representation of a network license data flow in accordance with the method and system of the present invention.

Referring now to FIG. 2 there is depicted a high level representation of a network license dataflow in accordance with the method and system of the present invention. This high level representation depicts various features and functions present within one or more systems within distributed data processing system 8. As illustrated, FIG. 2 depicts a personal computer 50 and two host systems 56 and 68. As depicted, host systems 56 and 68 are coupled together via the System Network Architecture Management Services (SNA/MS) transport applications program interface, though any equivalent peer-to-peer architecture could be used.

Still referring to FIG. 2, in the event the user at personal computer 50 indicates a request of the right to run a personal computer licensed program, as indicated at reference numeral 52, that request is relayed to host system A, as indicated at reference numeral 56, via the client/server environment, as depicted at reference numerals 54 and 62. Server software 62 is a component of operating system 60 and includes a license manager 64. The request for a use of the licensed program is then relayed to license manager 64. If a valid available license is present within license manager 64 a use token is then returned from the server to the client software so that the licensed program may execute.

In accordance with an important feature of the present invention, if a valid but unavailable license exists within distributed data processing system 8, licensed manager 64 forwards the request to system 68 via the SNA Management Services (SNA/MS) transport layer. This request will be forwarded to each system within distributed data processing system 8 in succession until a connection has been established.

This request from host system 56 is coupled to the network license server 72 within host system 68 which is then forwarded to license manager 74 within host system 68. In this manner the interface between the network license server and the license manager is a so-called "private" interface and not exposed at the transport level for security reasons. At this point license manager 74 within host system 68 checks for a valid available license and if a use token is not found an error response is returned to network license server 72 so that host system 56 can be advised to attempt to find a valid license within another system.

However, if a valid use token is found within host system 68, the token count for host system 68 will be decremented in a manner which will be explained in greater detail herein and a valid response is returned to network license server 72 and back to host system 56. The license manager 64 within host system 56 updates its accounts and relays a response back to the server which in turn relays the response to the client software within personal computer 50 such that the licensed program can execute.

In this manner the method and system of the present invention permit one system to "borrow" a use token for a license from another system, in effect combining the usage limits of all systems which are within distributed data processing system 8 into a pool which is available to all systems. The manner in which this is accomplished utilizes a cache design such that once a system has borrowed a use token for a licensed program that use token remains within the system until such time as another system requires the use token and the local system does not still require the use token. This is in direct contrast to traditional designs wherein the use token for a licensed program must be returned to the license server as soon as the local system has completed utilization of the licensed program. This cache design thus reduces license-related network traffic within distributed data processing system 8 and improves system performance.

In order to manage the sharing of licenses in accordance with the method and system of the present invention, each license manager within distributed data processing system 8 must be kept aware of and keep track of the following parameters for each licensed program installed within distributed data processing system 8;

Usage Limit: The "usage limit" is the maximum number of users which are authorized by the licensed program key protected license. A given licensed program, in accordance with the method and system of the present invention, may go over the usage limit for a particular system by borrowing use tokens from other systems within the network;

Token Count: The "token count" represents "uses" which are distributed throughout distributed data processing system 8 as use tokens. When a system borrows a "use token" its token count is incremented. When a system loans a use token to another system, its token count is decremented.

Local Count: The "Local Count" is the current number of permitted uses consumed by the licensed program running within a local system within distributed data processing system 8.

In addition to maintaining control of these three parameters, licensed managers utilizing the Local Count, Token Count and Usage Limit must follow two rules:

Rule No. 1: Within a local system a use token may be requested only if the Local Count for that local system is equal to or greater than the sum of the Usage Limit and Token Count for that system.

Rule No. 2: On a remote system a use token will be transmitted to another system only if the Local Count for that system is less than the sum of its Usage Limit and its Token Count.

Figure 3:
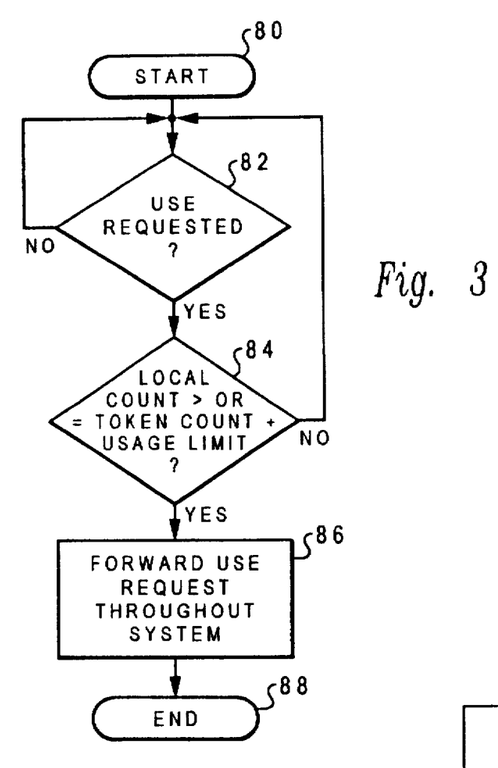
FIG. 3 is a high level logic flowchart illustrating the process by which a system within a distributed data processing system may request a permitted use of a licensed program in accordance with the method and system of the present invention.

With reference now to FIG. 3, there is illustrated a high level logic flowchart which depicts the process by which a system within a distributed data processing system may request a permitted use of a licensed program in accordance with the method and system described above. This process begins at block 80 and thereafter passes to block 82. Block 82 illustrates the detection of a use request for a licensed program within a local system. If no use request is detected, the process merely iterates until such time as a use request for a licensed program has been detected.

Still referring to block 82, in the event a use request for a licensed program has been detected the process passes to block 84. Block 84 illustrates a determination of whether or not the Local Count within that system is greater than or equal to the sum of the Token Count and Usage Limit. If not, the process returns to block 82 in an iterative fashion to await a subsequent use request. However, in the event the Local Count within the local system is greater than or equal to the sum of the Token Count and Usage Limit the process passes to block 86. Block 86 illustrates the forwarding of a use request throughout distributed data processing system 8. The process then passes to block 88 and terminates.

Figure 4:
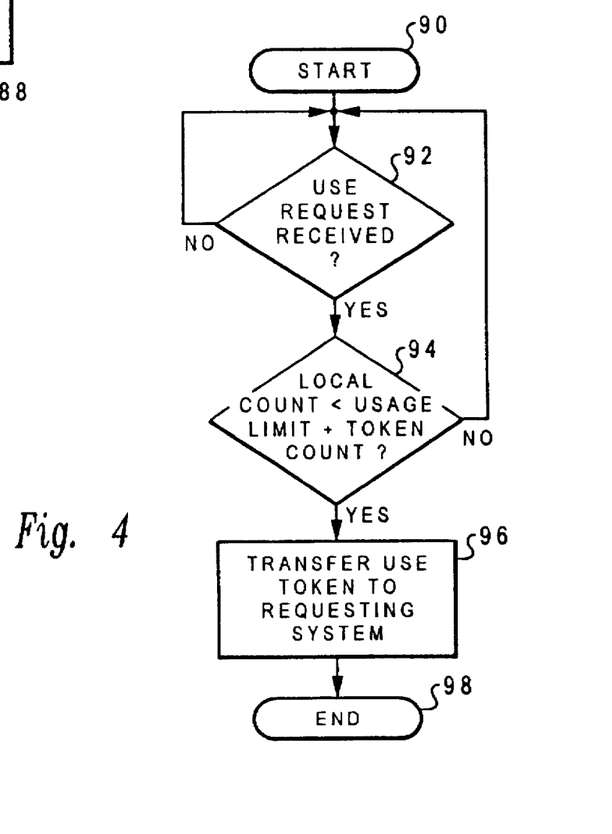
FIG. 4 is a high level logic flowchart illustrating the process by which a system within a distributed data processing system may transfer a permitted use of a licensed program to another system in accordance with the method and system of the present invention.

Referring now to FIG. 4, there is depicted a high level logic flowchart which illustrates the process by which a remote system within a distributed data processing system may transfer a permitted use of a licensed program to another system in accordance with the method and system of the present invention.

As illustrated, this process begins at block 90 and thereafter passes to block 92. Block 92 illustrates the receipt of a use request from a system within distributed data processing system 8. In the event no use request is received, the process merely iterates until such time as a use request occurs.

Still referring to block 92 in the event a use request has been received, the process passes to block 94. Block 94 illustrates a determination within the remote system of whether or not the Local Count is less than the sum of the Usage Limit and Token Count. If not, the process returns to block 92 in an iterative fashion to await a subsequent use request reception.

Still referring to block 94, in the event the Local Count within the remote system is less than the sum of the usage limit and the Token Count, the process passes to block 96. Block 96 illustrates the transferring of a use token to the requesting system. The process then passes to block 98 and terminates.

Finally, with references to FIGS. 5A–5H, there are depicted examples of licensed program management in accordance with the method and system of the present invention described above. For this example, a given licensed program is assumed to be installed within two connected systems and a key protected Usage Limit is set on each system of five usages. The licensed program will request a permitted use each time a user "signs on" to the licensed program. As depicted within FIG. 5A, initially system A is operating at its Usage Limit in that the Local Count for system A is equal to five users. System B, as illustrated at reference numeral 102, is operating below its Usage Limit with three users and the total of all network users, as depicted at reference numeral 104, is eight.

Figure 5A:
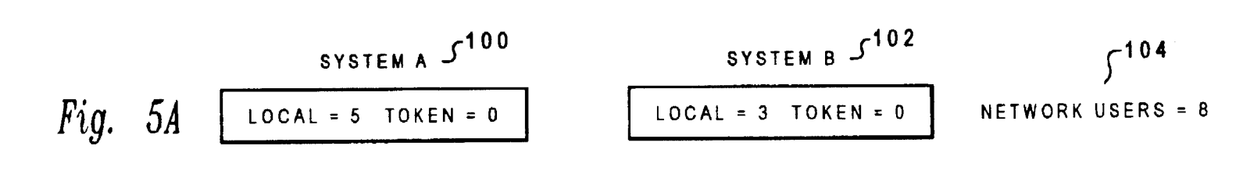
FIGS. 5A-5H illustrate examples of licensed program management in accordance with the method and system of the present invention.
Figure 5B:
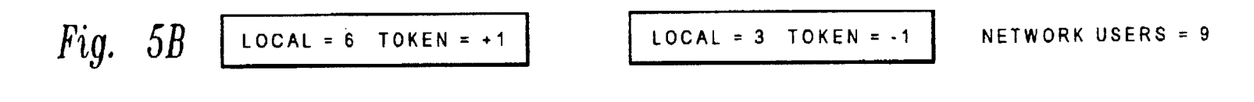

Next, referring to FIG. 5B, a user has signed on to system A raising the Local Count to six. As the Local Count is greater than or equal to the sum of the Usage Limit and the Token Count depicted within FIG. 5A, a token request is sent to system B. System B, as illustrated within Column 102, transmits a use token to system A and the Token Counts within each system are adjusted as depicted within FIG. 5B. Thus, system A now has a Local Count of six users and a Token Count of "plus one." System B includes a Local Count of three users and a Token Count of "minus one." The total number of network users, as depicted within Column 104, is now nine.

Figure 5C:
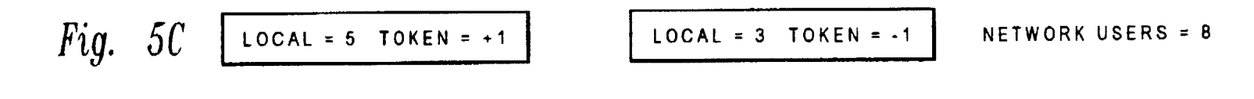

Next, in accordance with an important feature of the present invention, and as illustrated within FIG. 5C, a user within system A has signed off, freeing a licensed use within system A. In contrast to known license server technologies, the Token Counts within each system are maintained and the Local Count within system A drops to five users. The total number of network users within the system is now eight.

Figure 5D:
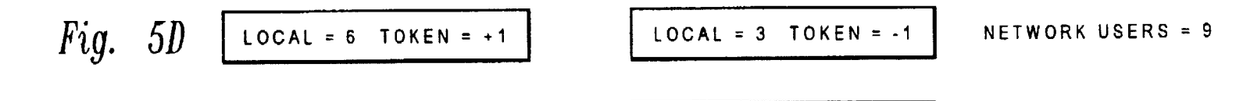

Next, as depicted within FIG. 5D, a new user has signed on to system A, as illustrated at Column 100. This raises the Local Count to six; however, no request is necessary for a use token as the Token Count within system A is "plus one" indicating that system A includes one use token above its nominal Usage Limit of five users. The number of network users, as depicted within Column 104, is now nine.

Figure 5E:
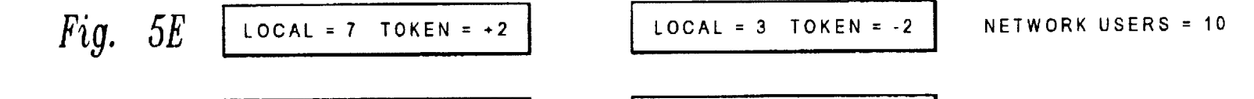

Referring now to FIG. 5E, a second user has signed on to system A, as depicted within Column 100. This raises the Local Count within system A to seven. As the Local Count is now greater than or equal to the sum of the Usage Limit and the Token Count another use token must be requested from system B. As the Local Count within system B is less than the sum of the Usage Limit for system B and the Token Count for system B, a token will be transferred from system B to system A, and the Local Count and Token Count are adjusted, as depicted within FIG. 5E. The total number of network users at this point is ten, the maximum number of users of the licensed program in the depicted scenario.

Figure 5F:
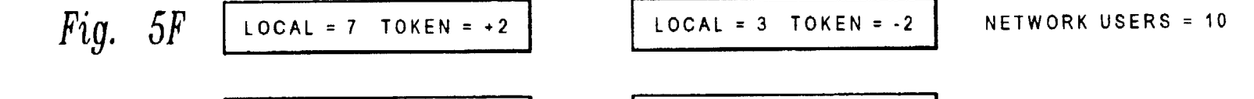

Next, as depicted within FIG. 5F a user may attempt to sign on to system B. As this will mean that system B's Local Count will be equal to or greater than the sum of the Usage Limit and its Token Count a use token request will be transmitted from system B to system A. However, system A cannot honor this request as its Local Count is not less than the sum of its Usage Limit and the Token Count. The total number of users of the licensed program within the network then remains at ten, as depicted within Column 104.

Figure 5G:
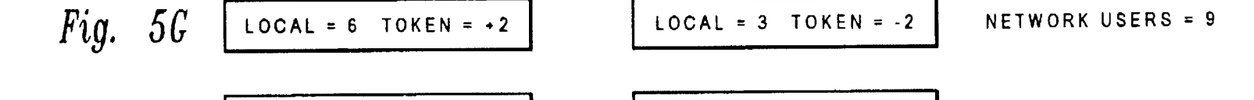

Next, referring to FIG. 5G, a user has signed off of the licensed program within system A. Thus, the Local Count within system A is reduced from seven to six and the Token Count remains unchanged. Number of total users within the network has now dropped to nine.

Figure 5H:
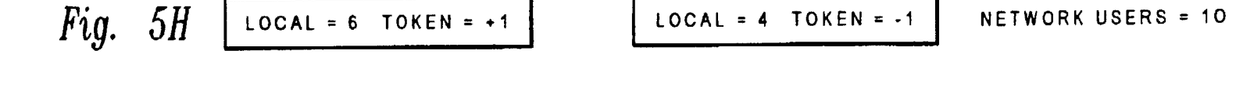

Additionally, as depicted within FIG. 5H, in the event a user signs on to system B, system B will transmit a request for use token to system A as its Local Count is now equal to or greater than the sum of the Usage Limit and the Token Count. As the Local Count within system A is less than the sum of its Usage Limit and its Token Count, a use token will be transferred from system A to system B and the Token Counts incremented and decremented in the manner depicted within FIG. 5H. Thus, system A includes six local users and has a Token Count of "plus one." System B has a Local Count of four and a Token Count of "minus one." The total number of network users is now the maximum permitted ten users.

Finally, as indicated within the present description, the primary aspects of this invention pertain to specific "method functions" which are implementable within computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterable stored on writable storage media (e.g., floppy disks and hard drives); or, (c) information conveyed to a computer through communication media such as telephone networks. It should therefore be understood that such media, when carrying that information, represent alternate embodiments of the present invention.

Upon reference to the foregoing those skilled in the art will appreciate that the method and system of the present invention provide for the efficient management of software licensing within a distributed data processing network while minimizing the amount of network communication traffic required by allowing use tokens for licensed software to be periodically redistributed between systems within the network and remain at a new location such that a subsequent request for usage of a particular licensed program will most likely be honored by the same server which has handled a previous request.

While the invention has been particularly shown and described with reference to a preferred embodiment, it will be understood by those skilled in the art that various changes in form and detail may be made therein without departing from the spirit and scope of the invention.

I claim:

1. A method for licensed program management within a distributed data processing network having a plurality of local systems which requires minimal network communication traffic, said method comprising the data processing system implemented steps of:

initially distributing a plurality of use tokens within said distributed data processing system, each of said plurality of use tokens indicative of a permitted use of a licensed program;

maintaining a local use count at each local system within said distributed data processing system, each local use count specifying the current number of permitted uses of said licensed program at an associated local system within said distributed data processing system;

periodically redistributing at least one of said plurality of use tokens to a particular system within said distributed data processing system in response to a requested usage of said licensed program at said particular system by:

requesting a use token redistribution to said particular local system within said distributed data processing system solely in response to a local use count for said particular local system being greater than or equal to the sum of a usage limit and a use token count for said particular local system;

permitting a use token redistribution from a selected local system within said distributed data processing system solely in response to said local use count for said selected local system being less than the sum of said usage limit and said use token count for said selected local system; and maintaining said at least one of said plurality of use tokens at said particular system within said distributed data processing system upon completion of said usage of said licensed program at said particular system wherein network communication traffic in response to requests to utilize said licensed program is minimized.

2. The method for licensed program management according to claim 1, further including the step of initially establishing a usage limit specifying the maximum number of permitted uses of a licensed program at each of said plurality of local systems within said distributed data processing system.

3. The method for licensed program management according to claim 2, further including the step of establishing an initial use token count at each local system within said distributed data processing system.

4. The method for licensed program management according to claim 3, further including the step of incrementing said initial use token count at a particular local system within said distributed data processing system in response to an automatic redistribution of a use token to said particular local system within said distributed data processing system.

5. The method for licensed program management according to claim 3, further including the step of decrementing said initial use token count at a particular local system within said distributed data processing system in response to an automatic redistribution of a use token from said particular local system within said distributed data processing system.

6. A system for licensed program management, said system comprising:

a distributed data processing network having a plurality of local systems;

a bus coupling said plurality of local systems;

a license distribution program that initially distributes a plurality of use tokens within said distributed data processing system, each of said plurality of use tokens indicative of a permitted use of a licensed program;

a use count program that maintains a local use count at each local system within said distributed data processing system, each local use count specifying the current number of permitted uses of said licensed program at an associated local system within said distributed data processing system;

a redistribution program that periodically redistributes at least one of said plurality of use tokens to a particular system within said distributed data processing system in response to a requested usage of said licensed program at said particular system comprising:

a use request program that requests a use token redistribution to said particular local system within said distributed data processing system solely in response to a local use count for said particular local system being greater than or equal to the sum of a usage limit and a use token count for said particular local system;

a use transfer program that permits a use token redistribution from a selected local system within said distributed data processing system solely in response to said local use count for said selected local system being less than the sum of said usage limit and said use token count for said selected local system; and a use token maintenance program that maintains said at least one of said plurality of use tokens at said particular system within said distributed data processing system upon completion of said usage of said licensed program at said particular system wherein network communication traffic in response to requests to utilize said licensed program is minimized.

7. The system for licensed program management according to claim 6, further including a usage limit program that initially establishes a usage limit specifying the maximum number of permitted uses of a licensed program at each of said plurality of local systems within said distributed data processing system.

8. The system for licensed program management according to claim 7, further including a token count program that establishes an initial use token count at each local system within said distributed data processing system.

9. The system for licensed program management according to claim 8, further including an incrementing program that increments said initial use token count at a particular local system within said distributed data processing system in response to an automatic redistribution of a use token to said particular local system within said distributed data processing system.

10. The system for licensed program management according to claim 8, further including a decrementing program that decrements said initial use token count at a particular local system within said distributed data processing system in response to an automatic redistribution of a use token from said particular local system within said distributed data processing system.

11. A computer program product for licensed program management within a distributed data processing network having a plurality of local systems, said computer program product adapted to be utilized within said distributed data processing system, said computer product comprising:

a license distribution program within said distributed data processing system that initially distributes a plurality of use tokens within said distributed data processing system, each of said plurality of use tokens indicative of a permitted use of a licensed program;

a use count program that maintains a local use count at each local system within said distributed data processing system, each local use count specifying the current number of permitted uses of said licensed Program at an associated local system within said distributed data processing system;

a redistribution program within said distributed data processing system that periodically redistributes at least one of said plurality of use tokens to a particular system within said distributed data processing system in response to a requested usage of said licensed program at said particular system comprising:

a use request program that requests a use token redistribution to said particular local system within said distributed data processing system solely in response to a local use count for said particular local system being greater than or equal to the sum of a usage limit and a use token count for said particular local system;

a use transfer program that permits a use token redistribution from a selected local system within said distributed data processing system solely in response to said local use count for said selected local system being less than the sum of said usage limit and said use token count for said selected local system; and a use token maintenance program within said distributed data processing system that maintains said at least one of said plurality of use tokens at said particular system within said distributed data processing system upon completion of said usage of said licensed program at said particular system wherein network communication traffic in response to requests to utilize said licensed program is minimized.

12. A method of transmitting a program product from a first computer system to a distributed data processing network, said method comprising the steps of:

establishing a connection between said first computer system and said distributed data processing network; and transmitting said program product from said first computer system to said distributed data processing network, said program product comprising:

a license distribution program within said distributed data processing system that initially distributes a plurality of use tokens within said distributed data processing system, each of said plurality of use tokens indicative of a permitted use of a licensed program;

a use count program that maintains a local use count at each local system within said distributed data processing system, each local use count specifying the current number of permitted uses of said licensed program at an associated local system within said distributed data processing system;

a redistribution program within said distributed data processing system that periodically redistributes at least one of said plurality of use tokens to a particular system within said distributed data processing system in response to a requested usage of said licensed program at said particular system comprising:
- a use request program that requests a use token redistribution to said particular local system within said distributed data processing system solely in response to a local use count for said particular local system being greater than or equal to the sum of a usage limit and a use token count for said Particular local system;
- a use transfer program that permits a use token redistribution from a selected local system within said distributed data processing system solely in response to said local use count for said selected local system being less than the sum of said usage limit and said use token count for said selected local system; and
- a use token maintenance program within said distributed data processing system that maintains said at least one of said plurality of use tokens at said particular system within said distributed data processing system upon completion of said usage of said licensed program at said particular system wherein network communication traffic in response to requests to utilize said licensed program is minimized.

* * * * *